United States Patent [19]

Blatchford

[11] Patent Number: 4,613,276
[45] Date of Patent: Sep. 23, 1986

[54] VEHICLE WITH LOAD HANDLING APPARATUS

[75] Inventor: Michael I. Blatchford, Oakhill, Nr. Shepton Mallet, England

[73] Assignee: Ralph Blatchford & Co. Ltd., Midsomer Norton, Nr. Bath, England

[21] Appl. No.: 586,839

[22] Filed: Mar. 6, 1984

[30] Foreign Application Priority Data

Mar. 7, 1983 [GB] United Kingdom ................. 8306239

[51] Int. Cl.⁴ ............................................... B60P 1/54
[52] U.S. Cl. ...................................... 414/542; 74/106; 212/73
[58] Field of Search ........................ 414/342, 348, 542; 212/75, 189, 73; 104/126; 410/26, 27; 248/654; 74/520, 106

[56] References Cited

U.S. PATENT DOCUMENTS

| | | | |
|---|---|---|---|
| 2,284,003 | 5/1942 | Luppert | 74/520 |
| 2,577,826 | 12/1951 | Thierry | 74/520 X |
| 3,175,698 | 3/1965 | Dassler | 74/106 X |
| 3,279,622 | 10/1966 | Person | 212/189 |
| 4,051,746 | 10/1977 | Liljeros | 74/520 |
| 4,385,861 | 5/1983 | Blatchford | 212/75 X |
| 4,518,304 | 5/1985 | Blatchford | 414/542 |

FOREIGN PATENT DOCUMENTS

| | | | |
|---|---|---|---|
| 29207 | 5/1981 | European Pat. Off. | 212/189 |
| 1755402 | 8/1971 | Fed. Rep. of Germany | 414/402 |

Primary Examiner—Robert J. Spar
Assistant Examiner—Stuart J. Millman
Attorney, Agent, or Firm—Banner, Birch, McKie & Beckett

[57] ABSTRACT

A vehicle has container handling apparatus at each end. This apparatus has a pedestal with track arms which with the pedestal form a lateral trackway on which a carriage can run, for lifting, traversing and lowering a container. Each track arm in the operative position is supported by an over-center toggle-jointed arm. The toggle arms are moved by relatively small and relatively low pressure hydraulic rams. In the over-center position of the arms each is locked by a short shaft mounted by the lower toggle joint and engaging with an edge of the upper toggle joint.

7 Claims, 4 Drawing Figures

VEHICLE WITH LOAD HANDLING APPARATUS

FIELD OF THE INVENTION

This invention relates to a vehicle having load handling apparatus. Containerization of goods for transport is well known and widely used, and there are already known various forms of apparatus for loading and unloading containers, for example from and to road vehicles (trucks) and rail vehicles (wagons).

DESCRIPTION OF THE PRIOR ART

In a vehicle having load handling apparatus in which two spaced upright load handling structures are mounted at or near each end of, for example, a road vehicle, it is known for each such structure to comprise an upstanding pedestal at the upper end of which is pivotally mounted one arm, or two opposed arms. The pedestal may be vertically telescopic. The or each arm is pivotal from an inoperative, folded down position up into an operative horizontal position in which the arm, or both arms, together with the top surface of the pedestal form a track extending laterally of the vehicle. On the track a carriage is movable, so that between the two spaced load handling structures a load, for example a container, can be lifted, lowered and traversed inboard and outward by the carriage.

It is also known to use a large, high pressure hydraulic ram for raising and lowering the or each arm of each load handling structure. This ram is required to support the load whilst the latter is being handled, so that the ram itself must be a load supporting member.

However, the use of a large, high-pressure hydraulic ram has various disadvantages. Firstly, the ram, being large and requiring to be capable of operation at high pressure so that it can support a heavy load, is itself necessarily a heavy and expensive member. Secondly, the ram, being large, takes up considerable space: this is particulary disadvantageous when the load handling apparatus is in its inoperative, folded-down state on the vehicle, in which state it is required to take up as little space as practicable, for road or rail transport operations. This leads to a third disadvantage. Because of the size of the known ram and the need to avoid taking up excessive space in the inoperative state, its upper end must be so connected to the relevant track arm that in the folded down position the ram is housed largely within the track arm. This in turn requires the lower side of the track arm to be open, to receive the ram in the folded-down inoperative state. Thus the arm cannot be made of box section but must be of generally U section and must therefore be made larger and heavier for a given load-bearing capacity. A fourth disadvantage of the known large, high-pressure ram which is used to support the loaded track arm, is that there is a tendency for the hydraulic ram fluid to become slightly compressed when supporting a heavy load, with a consequent slight "drooping" effect on the track arm, which is undesirable: it is necessary for proper operation that the track arm or arms should be properly horizontal when in use. A fifth disadvantage is that a large, high pressure directly load-supporting hydraulic ram is relatively slow to fill up or exhaust, for raising or lowering the track arm.

It is also known to provide at each end of a vehicle having load handling apparatus an extendible and retractable outrigger with a foot, and also to provide a pair of such outriggers at each end of the vehicle. It has been proposed to mount and accommodate an outrigger shaft in the base of the upright pedestal, to save fore and aft space, but the known proposal is unduly complex and space-consuming.

SUMMARY OF THE INVENTION

It is one obJect of this invention to provide a vehicle having load handling apparatus which largely overcomes the above discussed disadvantages. It is another object to provide a vehicle having load handling apparatus having an outrigger which is of simpler construction than known outriggers and occupies less space.

According to this invention there is provided a vehicle having load handling apparatus comprising a frame, an upright pedestal on the frame, one or more than one track arm mounted on the pedestal and movable from a lower, inoperative position into an upper, operative position, and a load-supporting carriage movable on the track arm, characterized by the provision of (i) a toggle-jointed arm (7, 27) connected at its upper end (8A, 28A) to the track arm (4, 24), and (ii) means (10, 30) for operating the toggle arm (7, 27) to raise the track arm (4, 24) from the lower, inoperative position to the upper, operative position in which the toggle-jointed arm (7, 27) supports the track arm (4, 24) and a load (25B) supported by the carriage (5, 25) on the track arm (4, 24).

BRIEF DESCRIPTION OF THE DRAWINGS

Embodiments of the invention will now be described by way of example, with reference to the drawings, in which.

DESCRIPTION OF THE PREFERRED EMBODIMENTS

Figure 1:
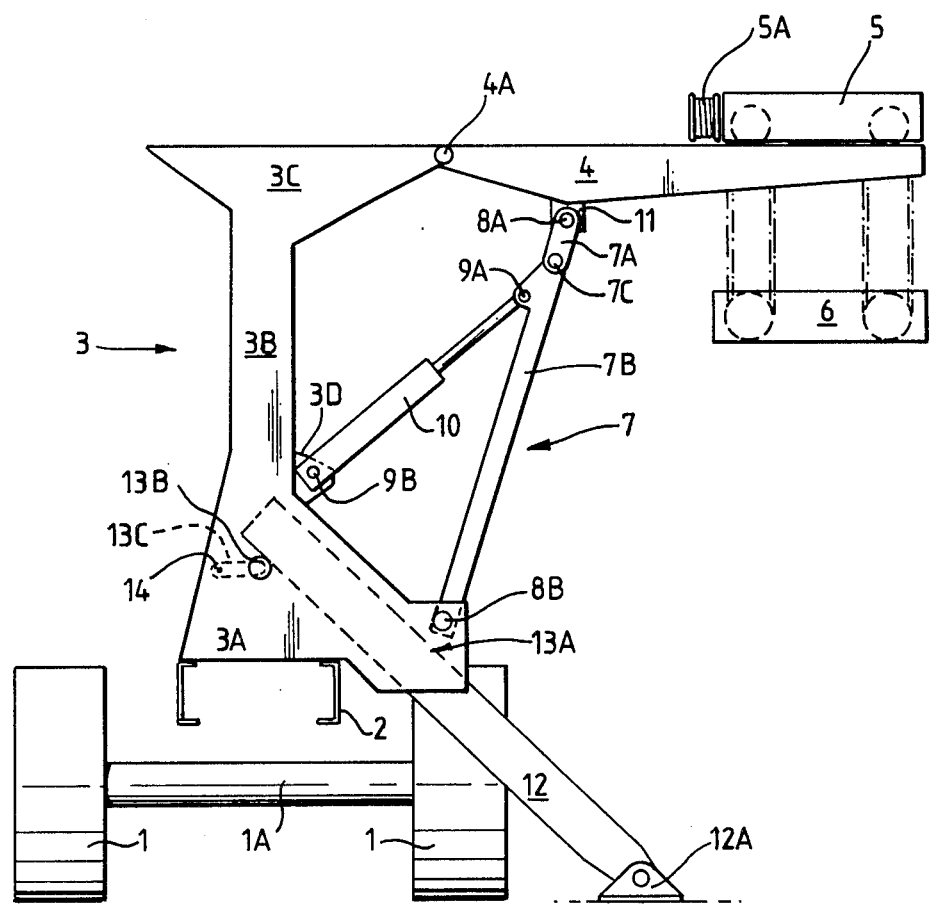
FIG. 1 is a diagrammatic end elevation showing a first embodiment of a vehicle having load handling apparatus in the operative, extended state.
Figure 2:
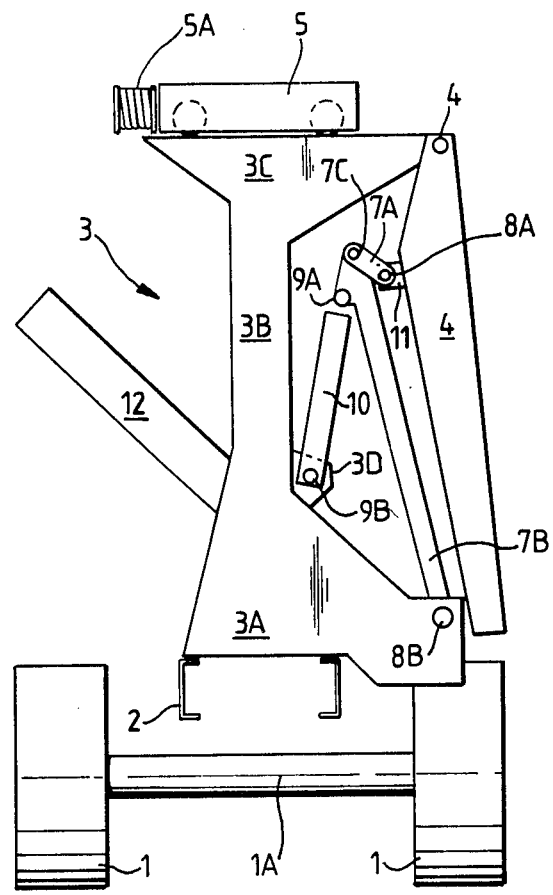
FIG. 2 is a like elevation showing the load handling apparatus of the first embodiment in its inoperative, folded down state.

Referring to the FIGS. 1 and 2 the rear axle 1A and wheels 1, 1 of a vehicle are diagrammatically shown, as is a frame 2, on which is mounted a non-telescopic, fixed pedestal 3 comprising a base portion 3A, a main portion 3B and a top portion 3C. Pivotally connected at 4A to the top portion 3C is a track arm 4 on which runs a carriage 5 having a winch 5A by which a load carrying beam or other member 6 is raised or lowered. The carriage 5 can run in and out along the track arm 4 and the upper surface of the top portion 3C for traversing the load in known manner.

The arm 4 is raised and lowered, and held in the upper operative position, seen in FIG. 1, by a toggle arm 7 comprising respective upper and lower toggle links 7A, 7B pivotally connected to one another at pivot 7C and also to the arm 4 and base portion 3A respectively at pivots 8A, 8B.

Pivotally connected at points 9A, 9B to the lower toggle link 7B and to a bracket 3D of the pedestal main portion 3B is a relatively small and low pressure double-acting hydraulic ram 10, which operates to raise and lower the arm 4 by way of the toggle arm 7. As will be seen the pivot point 9A is offset from the line of the extended toggle arm 7 (FIG. 1). Also as will be seen the pivot point 8A is below the arm 4, and is formed in a bracket 11 of the arm 4.

In the operative, FIG. 1 position, the weight of the arm 4, the carriage 5 and the load is taken directly by the straight toggle arm 7, and not, as in earlier constructions, by a large, high pressure ram. The ram 10 is used for moving the toggle arm only when the latter is in the unloaded state. For this reason the ram can be smaller and lighter, and can be operated at a lower pressure. As can be seen from FIG. 2 a compact folded down state can be achieved, with the ram 10 between the pedestal 3 and the folded down arm 4. The latter does not need to accommodate any part of the ram and so can be made of a strong box-section member.

An outrigger 12 has a foot 12A and is slidably mounted within the base portion 3A of the pedestal. The outrigger 12 is shown extended in FIG. 1, with its foot 12A in contact with the ground. In FIG. 2 the outrigger is retracted. It rides past a fixed bearing pad at 13A and over a roller 13B mounted at one end of a radius arm 13C which is angularly adjustable about a point 14, so that the angle of the outrigger can be adjusted to suit the ground conditions. Suitable locking means (not shown) are provided for holding the outrigger in a required position.

The arrangement shown provides that the load thrust down through the straight toggle arm 7 is taken directly on to the base portion 3A where it encloses the outrigger 12, at the bearing pad 13A.

Figure 3:
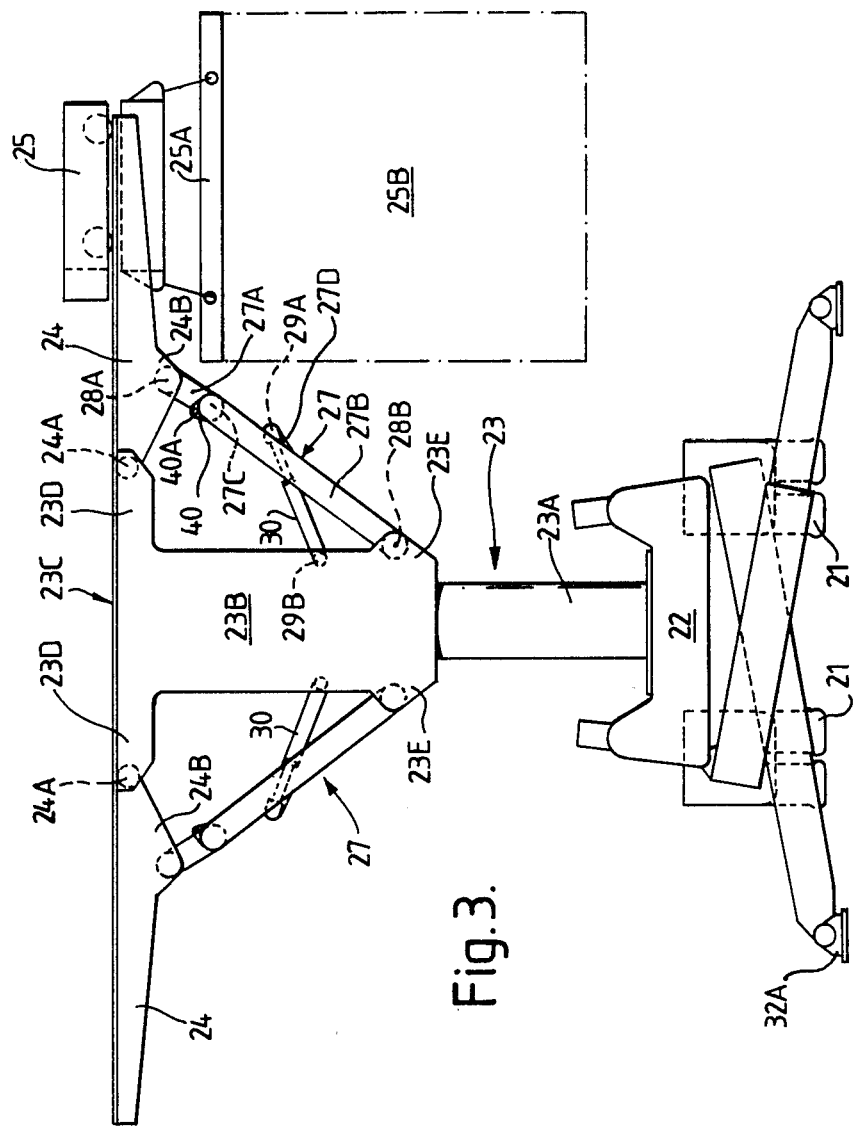
FIG. 3 is a diagrammatic end elevation of a second embodiment of vehicle having load handling apparatus in the operative, extended state.
Figure 4:
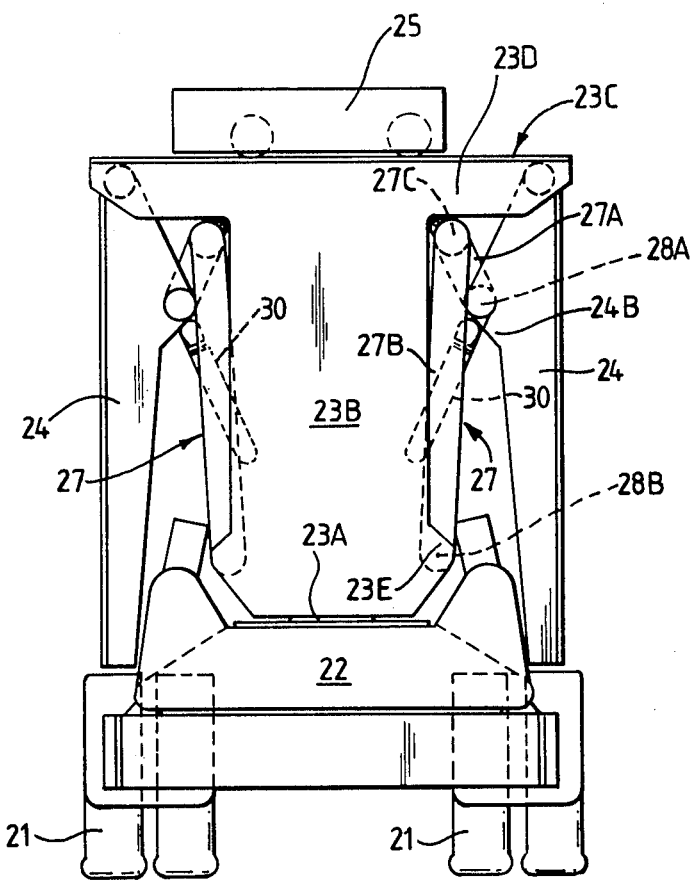
FIG. 4 is an elevation like that of FIG. 3, but showing the load handling apparatus of the second embodiment in its inoperative, folded down state.

Referring now to FIGS. 3 and 4, a second embodiment is shown. It is a road vehicle having wheels 21, 21 and a frame 22, with load handling apparatus comprising, at each end of the vehicle, a respective telescoping pedestal 23, on which are pivotally mounted oppositely folding track arms 24, 24. The pedestal 23 has a lower portion 23A fixed to the frame 22 and an upper portion 23B which telescopes vertically up and down on the lower portion 23A. The upper surface 23C of the upper pedestal portion 23B and the two track arms 24 constitute a horizontal track when in the extended, operative state seen in FIG. 3. On the track a carriage 25 is movable in known manner. From the carriage 25 is suspended a beam 25A which (together with a like carriage and beam at the other end of the vehicle) carries a container 25B. In known manner the container 25B can be lifted, lowered and traversed.

Each arm 24 is pivotally mounted at 24A on a respective one of two oppositely, laterally projecting portions 23D of the upper pedestal portion 23B. Each arm 24 has a downwardly projecting bracket 24B and the upper pedestal portion 23B has oppositely laterally projecting brackets 23E, 23E. At each side of the pedestal 23 a toggle arm 27 is mounted, being pivotally connected at its upper and lower ends respectively at pivot points 28A, 28B to the brackets 24B and 23E. The extended, operative position of the toggle arm 27 is seen in FIG. 3; the folded, inoperative position in FIG. 4. Each toggle arm 27 has an upper toggle link 27A and a lower toggle link 27B, pivotally connected together at point 27C. At the upper end of each lower toggle link 27B there are a pair of parallel, spaced brackets 40 of which only one is seen: these brackets project upwardly in the operative position, FIG. 3. Between their ends extends a short cross shaft 40A which, as shown, engages against the edge of the upper toggle link 27A.

For positive extension and retraction of the toggle arms 27, and thus for raising and lowering the track arms 24, respective hydraulic rams 30 act between the pedestal portion 23B and the respective lower toggle link 27B. The inner end of each ram 30 is pivotally connected at point 29B to the pedestal portion 23B. The outer end of each ram 30 is pivotally connected at point 29A to a bracket 27D on the outer, lower side of the lower toggle link 27B. As seen in FIG. 3, each ram 30 is therefore beyond the respective toggle arm 27. By this means a more compact arrangement is possible, particularly in the inoperative state, see FIG. 4, and the toggle link 27B can be of box section.

The hydraulic rams 30 may have known valves (not shown) to prevent movement of hydraulic fluid at appropriate times, so as to prevent collapse for example in the event of hydraulic hose failure.

In operation, when it is desired to raise the track arms 24 from the FIG. 4 to the FIG. 3 position, the rams 30 are activated to urge the lower toggle links 27B angularly outward about the pivot points 28E. With this movement the upper toggle links 27A are moved and the track arms 24 are thereby moved upwardly. The sizes of the various components and the positions of the various pivot points are such that in the horizontal position of the arms 24, FIG. 3, the toggle links 27A, 27B have been moved slightly over-center and the short shaft 40A has engaged the edge of the upper link 27A. This prevents further outward movement of the toggle arm 27, which, together with the respective track arm 24, is locked in position. The thrust of the load 25B is downwards through the locked toggle arm 27 to the pedestal bracket 23E: the rams 30 are thus only used for raising and lowering the track arms 24; the rams 30 do not participate directly in supporting the load and can therefore be relatively small and can operate at a relatively low pressure.

As seen in FIG. 4, the load handling structure on the vehicle is very compact, with the toggle arms and rams occupying little space between the pedestal portion 23B and the downwardly folded track arms 24.

I claim:

1. A vehicle having load handling apparatus comprising a frame, an upright pedestal on said frame, at least one track arm mounted on said pedestal to be movable from a lower, inoperative position into an upper, operative position, a load-supporting carriage movable on said track arm, a toggle-jointed arm comprising a lower toggle link and an upper toggle link, said upper toggle link being connected at its upper end to said track arm and a hydraulic ram connected at one end to said pedestal and at the other end to said lower toggle link of said toggle-jointed arm for operating said toggle-jointed arm to raise said track arm from the lower, inoperative position to the upper, operative position in which said toggle-jointed arm supports said track arm and a load supported by said carriage on said track arm, wherein the sizes of said ram, and of said upper and lower toggle links are such that when said track arm is in its upper, operative position said toggle-jointed arm is over-center.

2. A vehicle according to claim 1 wherein the means for operating the toggle-jointed arm is connected to the said toggle-jointed arm by a connection disposed at the side of the said toggle-jointed arm remote from the pedestal.

3. A vehicle according to claim 1 wherein the pedestal has oppositely laterally extending top portions on each of which is pivotally mounted a respective track arm.

4. A vehicle according to claim 1 wherein the or each track arm has a downwardly extending projection or bracket to which the toggle-jointed arm is connected.

5. A vehicle according to claim 1 wherein the pedestal has at least one laterally extending projection to which the toggle-jointed arm is connected.

6. A vehicle according to claim 5 wherein the pedestal has an upper portion telescopically mounted for vertical movement on a lower portion, the upper portion having oppositely laterally extending projections to each of which a toggle-jointed arm is connected.

7. A vehicle according to claim 1 including a vehicle-stabiizing outrigger arm, wherein the pedestal is formed with a passage or housing in which the outrigger arm is longitudinaly movabe for retraction or extension.

* * * * *